United States Patent [19]

Shepherd, Jr.

[11] 3,862,199

[45] Jan. 21, 1975

[54] ORGANOALUMINUM COMPOUNDS AND THEIR PREPARATION

[75] Inventor: Lawrence H. Shepherd, Jr., Baton Rouge, La.

[73] Assignee: Ethyl Corporation, Richmond, Va.

[22] Filed: Nov. 15, 1973

[21] Appl. No.: 416,063

[52] U.S. Cl.......... 260/448 A, 260/270 R, 260/299, 260/326.8, 260/340.6, 260/340.9, 260/345.1, 260/448 AD, 260/632 D
[51] Int. Cl. .............................................. C07f 5/06
[58] Field of Search...... 260/448 A, 448 AD, 340.6, 260/340.9, 326.8, 270 R, 299, 345.1

[56] References Cited
UNITED STATES PATENTS

| | | | |
|---|---|---|---|
| 3,631,065 | 12/1971 | Brendel et al. | 260/448 A |
| 3,634,482 | 1/1972 | Shepherd | 260/448 A |
| 3,641,084 | 2/1972 | Shepherd | 260/448 A |
| 3,642,825 | 2/1972 | Shepherd | 260/448 AD |
| 3,755,400 | 8/1973 | Shepherd | 260/448 A |

OTHER PUBLICATIONS

Nesmeyanov et al., Methods of Elements-Organic Chem., No. Holland Publ. Co., Amsterdam, Vol. 1, pp 466–467, 415–416, (1967).
Leiss, Organometallic Chem., Reinhold Publ. Corp., N.Y., pp. 236–238 (1960).

*Primary Examiner*—H. Sneed
*Attorney, Agent, or Firm*—Donald L. Johnson; John F. Sieberth

[57] ABSTRACT

Organoaluminum compounds possessing a vinylic aluminaoxacyclopentane moiety are described. They are prepared by reacting a nonionic organoaluminum compound possessing an aluminacyclopentene moiety with an aldehyde or ketone in the presence of a stable Lewis base. The compounds possessing the vinylic aluminoxacyclopentane moiety yield on hydrolysis olefinically unsaturated alcohols. Oxidation of the moiety followed by hydrolysis yields olefinically unsaturated diols.

35 Claims, No Drawings

ORGANOALUMINUM COMPOUNDS AND THEIR PREPARATION

This invention relates to cyclic organoaluminum compounds and their preparation.

This invention involves, inter alia, the discovery that the aluminacycloalkene compounds of the type described in U.S. Pat. No. 3,631,065 react with aldehydes and ketones to produce another class of cyclic aluminum compounds. The reaction in question involves the 1:1 molecular addition as between the aluminacyclopent-3-ene moiety and the aldehyde or ketone whereby there is formed an organoaluminum compound possessing a 4-vinylic-(1-alumina-2-oxacyclopentane) moiety. When formaldehyde is employed in the reaction, the 3 position of this moiety carries two hydrogen atoms whereas the use of higher aldehydes in the process gives rise to the formation of 4-vinylic-(1-alumina-2-oxacyclopentane) moieties having one carbon-bonded substituent in the 3 position, which substituent corresponds to the organic group attached to the carbonyl group which participates in the addition reaction. When employing an acyclic ketone (R'COR'') in the process, the 3 position of the moiety carries two separate carbonbonded substituents corresponding to the two organic groups (R' and R'') attached to the carbonyl group which participates in the addition reaction. On the other hand, when a cyclic ketone

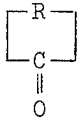

is used as the reactant, the divalent cyclic group (R) is attached to the carbon atom in the 3 position of the moiety so that the moiety has a spiro configuration. In all instances the substituted (1-alumina-2-oxacyclopentane) moiety is attached by means of an aluminum-carbon bond to an organic group, which in the ordinary situations will have no more than about 18 carbon atoms.

For best results the reaction is performed in the presence of a stable Lewis base--i.e., a Lewis base not susceptible to excessive cleavage during the course of the reaction. Since, as pointed out more fully hereinafter, the reaction can be performed under very mild reaction conditions, a wide variety of Lewis bases including tertiary amines, ethers, and other similar substances may be used for this purpose without encountering excess cleavage. Tertiary amines, dialkyl ethers, cycloparaffinic monoethers having a six-membered ring or cycloparaffinic diethers having a five- or six-membered ring exemplify preferred Lewis bases.

Accordingly, in one embodiment this invention provides a process of preparing an organoaluminum compound possessing a 4-vinylic-(1-alumina-2-oxacyclopentane) moiety which comprises reacting (i) a nonionic organoaluminum compound possessing an aluminacyclopent-3-ene moiety, the moiety being attached by means of an aluminum-carbon bond to a hydrocarbon group which optionally may be substituted by more than one additional so-bonded aluminacyclopent-3-ene moiety, with (ii) an aldehyde or ketone coreactive therewith so that 1:1 addition occurs therebetween, the reaction being conducted in the presence of a stable Lewis base. From the cost effectiveness standpoint the preferred cyclic aluminum reactants are those in which each aluminacyclopent-3-ene moiety has the formula

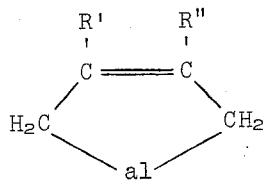

wherein R' is a hydrogen, alkyl or alkenyl group, R'' is a hydrogen or alkyl group, and "al" is two-thirds of an equivalent of aluminum.

A feature of this invention is that the foregoing reaction is a facile reaction which can be readily carried out under mild reaction conditions. In fact, the reaction proceeds very smoothly and efficiently even at room temperature and thus all that is required is to bring the reactants together in the presence of the Lewis base in a suitably inert, anhydrous reaction environment. Although the reaction can, if desired, be carried out at elevated temperatures as high as about 175°(as long as competing reactions do not occur excessively) there is no significant advantage in do so--reactions performed at temperatures within the range of from about −10 to 50°C. are generally found most convenient. Reactions at even lower temperatures are possible, though less convenient and generally slower.

A wide variety of aldehydes and ketones can be employed in the foregoing process, including those having one or a plurality of carbonyl groups in the molecule. The only requirement is that the aldehyde or ketone reactant be free from substituent groups which would prevent or seriously interfere with the desired 1:1 addition reaction, such as free hydroxyl groups, primary amino groups, carboxy groups and the like. It will of course be appreciated that the aldehydes and ketones will be employed in anhydrous condition--aqueous solutions of these materials are unsuitable. The aldehydes or ketones may be saturated or unsaturated and may contain substituents which are relatively inert to the aluminacyclopent-3-ene moiety at the reaction temperatures being used (room temperature, for example) such as halogen atoms in non-activated positions, tertiary amino groups (i.e., amino groups not containing nitrogen-hydrogen bonds), ether linkages, thioether linkages, $R_3Si-$ groups, $R_2P-$ groups, RSe— groups, XMgO— groups (X = halogen), $R_3SiO-$ groups, and the like. In short, use may be made of any aldehyde or ketone capable of reacting with the aluminacyclopent-3-ene moiety via a 1:1 addition reaction at a reaction temperature somewhere between about −40° and about 175°C. to form a 4-vinylic-(1-alumina-2-oxacyclopentane) moiety. Thus, functional substitutents may be present in the aldehyde or ketone reactant as long as they are innocuous in the sense they do not prevent the formation of the 4-vinylic-(1-alumina-2-oxacyclopentane) moiety nor interfere with the existence of this moiety once it has been formed. For example, aldehydes and ketones having highly reactive functional groups such as hydroxyl, primary and secondary amino, hydrazino, isonitroso, sulfamino, mercapto, imino, nitro, nitroso, sulfinyl, sulfonyl, etc., are ordinarily not recommended for use in the process. The suitability of any given aldehyde or ketone for use in the process can readily be determined by the simple expedient of performing a few pilot experiments using, for instance, the procedure set forth in the Example given hereinafter.

Some typical aldehydes and ketones which may be used in the process include acetaldehyde, acrolein, butyraldehyde, chloral, crotonaldehyde, formaldehyde, heptaldehyde, propionaldehyde, valeraldehyde, p-anisaldehyde, benzaldehyde, 4-bromobenzaldehyde, 4-chlorobenzaldehyde, 2,4-dichlorobenzaldehyde, 3,5-dichlorobenzaldehyde, 4-(diethylamino)-benzaldehyde, 3,5-dimethoxybenzaldehyde, p-dimethylaminobenzaldehyde, p-ethoxybenzaldehyde, p-fluorobenzaldehyde, 1-napthaldehyde, p-tolualdehyde, 3,4,5-trimethoxybenzaldehyde, cyclohexanecarboxaldehyde, cyclooctanecarboxaldehyde, 2-furaldehyde, glycidaldehyde, 5-methylfurfural, 1,2,3,6-tetrahydrobenzaldehyde, trifluoroacetaldehyde, 3-chloropropionaldehyde, 2-methyl-2-butenal, pentachlorobenzaldehyde, phenylacetaldehyde, 2-methoxybenzaldehyde, 3-methoxybenzaldehyde, 4-methoxybenzaldehyde, 3,7-dimethyl-6-octenal, acetone, benzylacetone, 2-butanone, 1-chloro-3-pentanone, di-n-hexyl ketone, 2,6-dimethyl-4-heptanone, ethyl vinyl ketone, 3-heptanone, 2-hexanone, 5-methyl-2-hexanone, methyl vinyl ketone, 2-nonanone, 3-octanone, diethyl ketone, pinacolone, benzophenone, 4-chlorobenzophenone, 4,4-dichlorobenzophenone, 4-methylbenzophenone, acetophenone, p-anisyl benzyl ketone, p-bromoacetophenone, p-chloroacetophenone, p-methoxyacetophenone, 3',4',5'-trimethoxyacetophenone, bicyclo[3.2.1]octan-2-one, di-camphor, cyclobutanone, cyclohexanone, 1-decalone, estrone (chloromagnesium salt or tetrahydropyranyl ether), 9-fluorenone, isophorone, norcamphor, testosterone (chloromagnesium salt or tetrahydropyranyl ether), beta-tetralone, cyclobutyl phenyl ketone, cyclopropyl methyl ketone, cyclopropyl phenyl ketone, dicyclopropyl ketone, griseofulvin, equilenin (chloromagnesium salt or tetrahydropyranyl ether), androsterone (chloromagnesium salt or tetrahydropyranyl ether), dehydroisoandrosterone (chloromagnesium salt or tetrahydropyranyl ether) and the like. Aldehydes and ketones which contain one carbonyl group, up to about 30 carbon atoms and no other substituent in the molecule serve as one typical group of preferred reactants for use in the process of this invention.

As noted above, the cyclic organoaluminum compounds provided by this invention possess a 4-vinylic-(1-alumina-2-oxacyclopentane) moiety, the moiety being attached by means of an aluminum-carbon bond to an organic group which normally will contain up to about 18 carbon atoms. In addition to the vinylic substituent in the 4 position, the moiety when formed from an aldehyde other than formaldehyde or from a ketone will contain one or two carbon-bonded substituents in the 3 position corresponding to the organic group(s) to which the reaction-participating carbonyl group was attached in the aldehyde or ketone reactant. For example, when the reactant is (a) acetaldehyde, (b) methyl isobutyl ketone, (c) cyclopentanone, and (d) acetylacetone the substituent(s) in the 3 position of the resultant 4-vinylic(1-alumina-2-oxacyclopentane) moieties formed in the respective 1:1 addition reactions are (a) methyl, (b) methyl and isobutyl, (c) tetramethylene, and (d) methyl and acetonyl. Thus, this invention provides an organoaluminum compound possessing a 4-vinylic-(1-alumina-2-oxacyclopentane) moiety which may have one or two innocuous carbon-bonded substituents in the 3 position, innocuous in the moiety that the substituent(s) did not prevent the formation of the moiety nor interfere with the existence of the moiety once it was formed. A few exemplary moieties of this type include those in which the substituent(s) in the 3 position is (are) one or two hydrocarbyl substituents each having up to about 18 carbon atoms, the vinylic substituent in the 4 position being the vinyl group, the isopropenyl group, the 1-ethylvinyl group, or the 1-(4-methyl-pent-3-enyl)vinyl group. The 4 position in the moiety can contain another substituent in addition to the vinylic substituent. One group of such compounds is those in which the 3 position carries one or two hydrocarbyl substituents each having up to about 18 carbon atoms and the 4 position contains an isopropenyl group and a methyl group.

The organic group bonded by means of an aluminum-carbon bond to the aluminum atom in the 4-vinylic-(1-alumina-2-oxacyclopentane) moiety will generally correspond to the hydrocarbon group present in the initial aluminacyclopent-3-ene reactant and accordingly for further details reference may be made to U.S. Pat. Nos. 3,631,065; 3,634,482; and 3,755,400, each of which deals, inter alia, with the synthesis of organic compounds containing the aluminacyclopent-3-ene moiety. All such compounds are suitable for use in the practice of this invention and in the usual case the identity of the organic group satisfying the remaining valence bond of the aluminum atom in the aluminacyclopent-3-ene moiety is of no practical significance. Normally this organic group which satisfies the third valence bond of the aluminum atom may be regarded as "excess baggage" which does not affect the outcome of the desired addition reaction.

One preferred group of cyclic aluminum reactants for use in the process of this invention has the formula

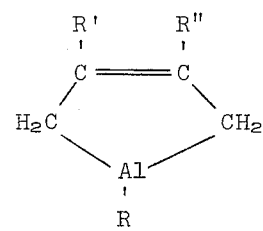

wherein R is a hydrocarbon group having up to about 18 carbon atoms, R' is hydrogen or an alkyl or an alkenyl group, and R'' is hydrogen or an alkyl group. Although R' and R'' may contain any suitable number of carbon atoms (e.g., 12 or more), in most cases they will contain up to about 6 carbon atoms each--i.e., they are preferably lower alkyl or lower alkenyl groups or hydrogen.

One group of preferred organoaluminum compounds provided by this invention is composed of those having the formula

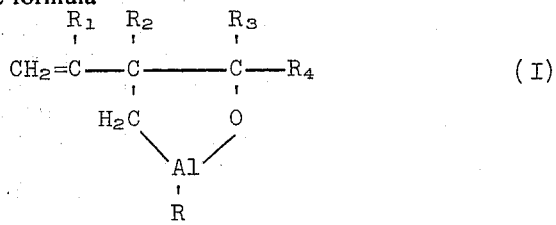

(I)

wherein R is a hydrocarbon group having up to about 18 carbon atoms (most preferably a lower alkyl group) and in the simplest cases $R_1$ is hydrogen, alkyl or an alkenyl group, $R_2$ is hydrogen or an alkyl group, $R_3$ is hydrogen or an innocuous carbon-bonded organic group having up to about 30 carbon atoms, such as a hydrocarbyl group having up to about 30 carbon atoms (which in turn may carry innocuous substituents), and $R_4$ is hydrogen or an innocuous carbon-bonded organic group having up to about 30 carbon atoms, such as a hydrocarbyl group having up to about 30 carbon atoms (which in turn may carry innocuous substituents). One sub-group of such compounds involves those in which $R_3$ and $R_4$ are, independently, hydrogen or hydrocarbyl groups containing up to about 18 carbon atoms. Since it is convenient to utilize diisobutylaluminum hydride or sodium aluminum tetraethyl in the synthesis of the aluminacyclopent-3-ene moiety containing compounds used to form the organoaluminum compounds depicted in Formula (I) above (see U.S. Pat. Nos. 3,631,065 and 3,634,482, respectively), R in the above formula (and in Formula (II) below) will frequently be isobutyl or ethyl.

When simple aldehydes and ketones are employed as reactants in the process of this invention, moieties are typically formed in which $R_3$ is a hydrogen, alkyl, alkenyl, cycloalkyl, cycloalkenyl, aralkyl, or aryl group and $R_4$ is a hydrogen, alkyl, alkenyl, cycloalkyl, cycloalkenyl, aralkyl, or aryl group.

Another group of preferred organoaluminum compounds provided by this invention may be represented by the formula

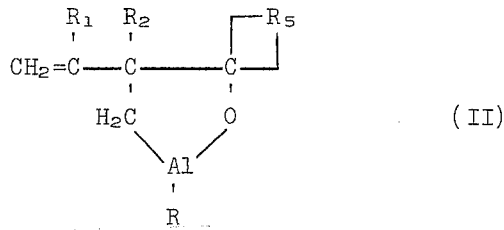

(II)

wherein R, $R_1$ and $R_2$ are as defined with respect to Formula (I) above and $R_5$ is a divalent cyclic carbon-bonded substituent such as a hydrocarbyl group containing from 2 to about 40 carbon atoms (which in turn may carry innocuous substituents). It will be appreciated that these compounds have a spiro configuration and are obtained upon reacting the aluminacyclopent-3-ene moiety with a suitable cyclic ketone.

There is a marked tendency for the cyclic aluminum compounds of this invention (e.g., Formulas I and II above) to form complexes with Lewis bases such as amines, ethers, thioethers, and the like. These complexes, especially when the Lewis base is a tertiary amine, dialkyl ether, cycloparaffinic monoether having a six-membered ring or cycloparaffinic diether having a five- or six-membered ring, constitute preferred embodiments of this invention.

The cyclic aluminum compounds of this invention are nonionic. They are usually soluble in conventional aliphatic and aromatic hydrocarbon solvents such as benzene.

Another feature of this invention is the fact that the organoaluminum compounds provided by this invention are of particular utility as intermediates in the synthesis of various polyfunctional products. For example, on hydrolysis the compounds of this invention yield olefinically unsaturated alcohols. Unless isomerization of the double bond is desired it is usually preferable to use relatively mild hydrolysis conditions, e.g., hydrolysis with water or dilute acid at 0° to 25° or 30°C. The hydrolysis can be carried out under more stringent reaction conditions, however. Alternatively, the cyclic organoaluminum compounds of this invention may be subjected to low temperature oxidation with air or oxygen to yield a cyclic alkoxide intermediate which, on hydrolysis, yields olefinically unsaturated 1,3-diols. The oxidation of the substituted 1-alumina-2-oxacyclopentane moiety to form the corresponding cyclic alkoxide moiety (1-alumina-2,6-dioxacyclohexane) utilizes reaction conditions such as described in U.S. Pat. No. 3,642,825.

In order to further appreciate the practice and advantages of this invention there are presented below in tabular form some typical products which may be produced by some of the reactions described above.

TABLE

| (1) Aluminacyclopent-3-ene Moiety in the Reactant | (2) Aldehyde or Ketone Reactant | (3) 4-Vinylic-(1-alumina-2-oxacyclopentane) Moiety Formed on 1:1 Addition Between (1) and (2) | (4) Olefinically Unsaturated Alcohol Formed on Hydrolysis of (3) | Olefinically Unsaturated Diol Formed on Oxidation of (3) Followed by Hydrolysis |
|---|---|---|---|---|
| 3-methyl-aluminacyclopent-3-ene | propionaldehyde | 4-isopropenyl-3-ethyl-(1-aluminacyclo-2-oxacyclopentane) | 4,5-dimethyl-hex-5-en-3-ol | 2-isopropenyl-pentane-1,3-diol |
| aluminacyclopent-3-ene | acrolein | 3,4-divinyl-(1-alumina-2-oxacyclopentane) | 4-methyl-1,5-hexadien-3-ol | 1,2-divinyl-propane-1,3-diol |
| 3-ethyl-aluminacyclopent-3-ene | crotonaldehyde | 4-(1-ethylvinyl)-3-(1-propenyl)-(1-alumina-2-oxacyclopentane) | 6-ethyl-5-methyl-hepta-2,6-dien-4-ol | 2-(1-ethylvinyl)-hex-4-en-1,3 diol |
| aluminacyclopent-3-ene | acrolein dimer | 4-vinyl-3-(2-oxacyclohex-3-en-1-yl)-(1-alumina-2-oxacyclopentane) | 1-(2-oxacyclohex-3-en-1-yl)-2-methyl-but-3-en-1-ol | 1-(2-oxacyclohex-3-en-1-yl)-2-vinyl-propane-1,3-diol |
| 3,4-dimethyl-alumina-cyclopent-3-ene | chloral | 4-isopropenyl-3-trichloro-methyl-4-methyl-(1-alumina-2-oxacyclo-pentane) | 1,1,1-trichloro-3,3,4-trimethyl-pent-4-en-2-ol | 4,4,4-trichloro-2-isopropenyl-2-methyl-butane-1,3-diol |
| aluminacyclopent-3-ene | 1,2,3,6-tetra-hydrobenzaldehyde | 4-vinyl-3-(3-cyclohexenyl)-(1-alumina-2-oxacyclo-pentane) | 1-(3-cyclohexenyl)-2-methyl-but-3-en-1-ol | 1-(3-cyclohexenyl)-2-vinyl-propane-1,3-diol |
| 3-methyl-aluminacyclo-pent-3-ene | glutaraldehyde | 4-isopropenyl-3-(3-formyl-propyl)-(1-alumina-2-oxacyclopentane) | 6,7-dimethyl-5-ol-oct-7-enal | 6-isopropenyl-5,7-diol-heptanoic acid |
| aluminacyclopent-3-ene | furfural | 4-vinyl-3-(2-furyl)-(1-alumina-2-oxacyclo-pentane) | 1-(2-furyl)-2-methyl-but-3-en-1-ol | 1-(2-furyl)-2-vinyl-propane-1,3-diol |
| 3-methyl-aluminacyclo-pent-3-ene | isophorone | 3,5,5-trimethylcyclohex-2-enespiro-[5'-isopropenyl-(3'-alumina-2'-oxacyclo-pentane)] | 1-(1,2-dimethylallyl)-3,5,5-trimethylcyclo-hex-2-en-1-ol | 1-(1-hydroxymethyl-2-methyl-allyl)-3,5,5-trimethyl-cyclohex-2-en-1-ol |

The transformations set forth in the tabulation give some indication of the variety of products which can now be readily produced by virtue of this invention. It will be appreciated of course that it is possible to isomerize the double bond in the olefinically unsaturated alcohols and diols produced upon hydrolysis (columns 4 and 5 of the above tabulation). Thus, if alcohols or diols having a double bond in a different position are desired, suitable isomerization procedures are available for effecting this transformation.

The following example specifically illustrates a typical synthesis of a representative compound of this invention and its use as an intermediate in the formation of an olefinically unsaturated alcohol product. This example is presented merely for the purposes of illustration and should not be construed in a limiting sense.

EXAMPLE

Reaction of
1-isobutyl-3-methyl-aluminacyclopent-3-ene with diethyl ketone followed by hydrolysis To 15 ml of a 1,4-dioxane solution containing 15 mmoles of 1-isobutyl-3-methyl-aluminacyclopent-3-ene (see U.S. Pat. No. 3,631,065) was slowly added 3.2 milliliters (approximately 30 mmoles) of diethyl ketone over a period of about 30 minutes while stirring the reaction mixture. Thereupon most of the dioxane was stripped off under vacuum and the residue was hydrolyzed with water in diethyl ether followed by addition of cold dilute HCl. The ether solution was washed with water, dilute aqueous sodium bicarbonate solution and finally with water. The ether solution was then dried over magnesium sulfate. Thereupon the diethyl ether was stripped off and the residue (6.6 grams) was vacuum distilled whereby 2.05 grams of alkenol product was obtained at 82°C. and ca. 7 millimeters of mercury pressure. This amounted to an 83 percent yield of isolated product, the theoretical yield being 2.46 grams. The structure of the alkenol was established by means of nuclear magnetic resonance and infrared spectra and the product was found to be a mixture of 3-ethyl-4,5-dimethylhex-5-en-3-ol and 3-ethyl-4,4-dimethylhex-5-en-3-ol, the former constituting the major portion of the product.

It will be seen therefore that the cyclic organoaluminum product formed in the above addition reaction was a mixture of 4-isopropenyl-1-isobutyl-3,3-diethyl-(1-alumina-2-oxacyclopentane):

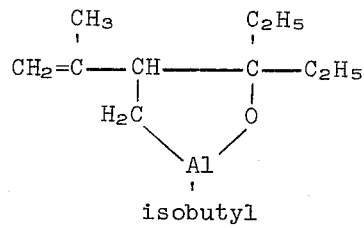

together with a smaller proportion of 4-vinyl-1-isobutyl-3,3-diethyl4-methyl-(1-alumina-2-oxacyclopentane):

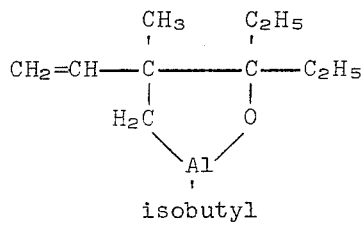

As noted above, the process of this invention is normally conducted in the presence of a Lewis base having suitable chemical stability under the reaction conditions being utilized. In most cases the Lewis base will be employed as the principal reaction solvent--i.e., the reaction will be conducted in the Lewis base selected for use. However, if desired, the reaction may be effected in a suitable inert hydrocarbon medium (e.g., paraffinic or aromatic hydrocarbon solvents such as hexane, heptane, octane, decane, cyclohexane, benzene, toluene, xylenes, and the like) provided a suitable amount of the Lewis base is also present in the reaction system. Ordinarily the system should contain at least one or two mols of Lewis base per mol of aluminum reactant employed. Particularly convenient Lewis bases for use in the process are tertiary amines (e.g., trimethyl amine, dimethylethyl amine, triethyl amine, tributyl amine, triphenyl amine, tribenzyl amine, benzyldimethyl amine, N-methyl morpholine, N,N-diethyl aniline, N,N,N',N'-tetramethyl methylene diamine, N,N,N',N'-tetramethyl ethylene diamine, pyridine, N-methyl pyrrolidine, triethylene diamine, quinuclidine, and the like); dialkyl ethers (e.g., dimethyl ether, diethyl ether, diisopropyl ether, methylisoamyl ether, dibutyl ether, dihexyl ether and the like); cycloparaffinic monoethers having a six-membered ring (e.g., tetrahydropyran--pentamethylene oxide--and ring alkylated derivatives thereof); and cycloparaffinic diethers having a five- or six-membered ring (e.g., 1,4-dioxane, 1,3-dioxolane, 2-methyl-2-ethyl-1,3-dioxolane; and the like); and other similar substances which tend not to be excessively cleaved in the reaction, such as dicyclohexyl ether, dibenzyl ether, and the like. At the lower reaction temperatures glycol ethers are also suitable solvents.

The relative proportions of the reactants and reaction diluents do not appear to be critical as long as there is present a sufficient amount of each reactant to participate in the desired reaction.

Ordinarily the reaction will be conducted at atmospheric pressure or at the ambient pressures encountered when conducting the reaction in a closed reaction vessel. However, when using some of the lower boiling Lewis base solvents, e.g., dimethyl ether, trimethyl amine or the like, it is desirable to conduct the reaction at a high enough pressure to keep the system in the liquid state of aggregation. Thus, pressures up to about 50 atmospheres may be employed.

It will of course be understood that in the addition reaction the reaction mixture should be kept essentially anhydrous and that exposure of the reaction system to air should be kept at a minimum. Naturally one should select a reaction temperature at which the reaction proceeds at a satisfactory rate without encountering excessive adverse side reactions such as thermal decomposition, undesired cleavage reactions, undesired competitive reactions or the like.

The period of time during which the reactants interact with each other is susceptible to considerable variation and is generally discretionary. In general, the higher the reaction temperature, the shorter the reaction or contact time.

Exemplary of the compounds of this invention which may be produced in the manner described above are the following:

4-vinyl-1-ethyl-3-benzyl-(1-alumina-2-oxacyclopentane)
4-isopropenyl-1-propyl-3-penzyl-(1-alumina-2-oxacyclopentane)
4-isopropenyl-1-butyl-3,4,5-trimethyl-(1-alumina-2-oxacyclopentane)
4-(1-ethylvinyl)-1-isobutyl-3-p-chlorophenyl-(1-alumina-2-oxacyclopentane)
4-vinyl-1-octadecyl-3,3-bis-trichloromethyl-(1-alumina-2-oxacyclopentane)
4-[1-(4-methylpent-3-enyl)vinyl]-1-phenyl-(1-alumina-2-oxacyclopentane)

Other products of this invention and their synthesis and use will be clearly apparent to those skilled in the art from a consideration of the foregoing disclosure and ensuing claims.

I claim:

1. An organoaluminum compound possessing a 4-vinylic-(1-alumina-2-oxacyclopentane) moiety, the moiety being attached by means of an aluminum-carbon bond to a hydrocarbon group having up to about 18 carbon atoms.

2. A compound according to claim 1 wherein said moiety has one innocuous carbon-bonded organic substituent in the 3 position, innocuous in the sense that said substituent did not prevent the formation of said moiety nor interfere with the existence of said moiety once it was formed.

3. A compound according to claim 1 wherein the moiety has an innocuous divalent cyclic carbon-bonded organic substituent in the 3 position so that the moiety has a spiro configuration, said substituent being innocuous in the sense that said substituent did not prevent the formation of said moiety nor interfere with the existence of said moiety once it was formed.

4. A compound according to claim 1 wherein the moiety has two separate innocuous carbon-bonded organic substituents in the 3 position, innocuous in the sense that said substituents did not prevent the formation of said moiety nor interfere with the existence of said moiety once it was formed.

5. A compound according to claim 1 wherein the vinylic substituent in the 4 position of said moiety is the vinyl group.

6. A compound according to claim 1 wherein the vinylic substituent in the 4 position of said moiety is the isopropenyl group.

7. A compound according to claim 1 wherein the vinylic substituent in the 4 position of said moiety is the 1-ethylvinyl group.

8. A compound according to claim 1 wherein the vinylic substituent in the 4 position of said moiety is the isopropenyl group and wherein the 4 position of said moiety also carries a methyl group.

9. A compound according to claim 1 wherein the vinylic substituent in the 4 position of said moiety is the 1-(4-methyl-pent-3-enyl)-vinyl group.

10. A compound according to claim 1 complexed with a Lewis base.

11. A compound according to claim 1 complexed with an ether or a tertiary amine.

12. An organoaluminum compound of the formula

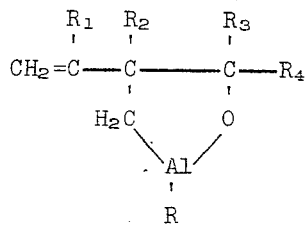

wherein R is a hydrocarbon group having up to about 18 carbon atoms, $R_1$ is hydrogen or an alkyl or an alkenyl group, $R_2$ is hydrogen or an alkyl group, $R_3$ is hydrogen or an innocuous carbon-bonded organic group having up to about 30 carbon atoms, and $R_4$ is hydrogen or an innocuous carbon-bonded organic group having up to about 30 carbon atoms, each said carbon-bonded organic group being innocuous in the sense that it did not prevent the formation of said moiety nor interfere with the existence of said moiety once it was formed.

13. A compound according to claim 12 wherein R is a lower alkyl group.

14. A compound according to claim 12 wherein $R_3$ is hydrogen or a hydrocarbyl group containing up to about 18 carbon atoms and $R_4$ is hydrogen or a hydrocarbyl group containing up to about 18 carbon atoms.

15. A compound according to claim 12 wherein R is a lower alkyl group, $R_3$ is a hydrogen, alkyl, alkenyl, cycloalkyl, cycloalkenyl, aralkyl, or aryl group and $R_4$ is a hydrogen, alkyl, alkenyl, cycloalkyl, cycloalkenyl, aralkyl, or aryl group.

16. A compound according to claim 12 complexed with a Lewis base.

17. A compound according to claim 12 complexed with a tertiary amine, a dialkyl ether, a cycloparaffinic monether having a six-membered ring or a cycloparaffinic diether having a five- or six-membered ring.

18. A compound according to claim 12 complexed with 1,4-dioxane.

19. A composition according to claim 12 wherein the compound is 4-isopropenyl-1-isobutyl-3,3-diethyl-(1-alumina-2-oxacyclopentane).

20. An organoaluminum compound of the formula

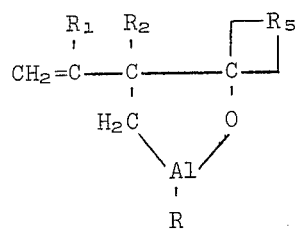

wherein R is a hydrocarbon group having up to about 18 carbon atoms, $R_1$ is hydrogen or an alkyl or an alkenyl group, $R_2$ is hydrogen or an alkyl group, and $R_5$ is an innocuous divalent cyclic carbon-bonded organic substituent, innocuous in the sense that said substituent did not prevent the formation of said moiety nor interfere with the existence of said moiety once it was formed.

21. A compound according to claim 20 wherein R is a lower alkyl group.

22. A compound according to claim 20 wherein $R_5$ is a hydrocarbylene group containing from 2 to about 40 carbon atoms.

23. A compound according to claim 20 complexed with a Lewis base.

24. A compound according to claim 20 complexed with a tertiary amine, a dialkyl ether, a cycloparaffinic monoether having a six-membered ring or a cycloparaffinic diether having a five- or six-membered ring.

25. A compound according to claim 20 complexed with 1,4-dioxane.

26. A process of preparing an organoaluminum compound possessing a 4-vinylic-(1-alumina-2-oxacyclopentane) moiety which comprises reacting (i) a nonionic organoaluminum compound possessing an aluminacyclopent-3-ene moiety, the moiety being attached by means of an aluminum-carbon bond to a hydrocarbon group which optionally may be substituted with no more than one additional so-bonded aluminacyclopent-3-ene moiety with (ii) an aldehyde or ketone coreactive with said moiety so that a 1:1 addition occurs therebetween, the reaction being conducted in the presence of a stable Lewis base.

27. The process of claim 26 wherein the Lewis base is an ether or a tertiary amine.

28. The process of claim 26 wherein the Lewis base is a tertiary amine, a dialkyl ether, a cycloparaffinic monoether having a six-membered ring, or a cycloparaffinic diether having a five- or six-membered ring.

29. The process of claim 26 wherein an aldehyde coreactive with said moiety is employed.

30. The process of claim 26 wherein a ketone coreactive with said moiety is employed.

31. The process of claim 26 wherein the aluminacyclopent-3-ene moiety has the formula

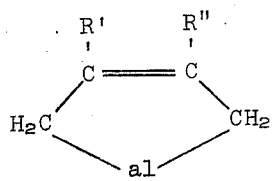

wherein R' is a hydrogen, alkyl or alkenyl group, R" is a hydrogen or alkyl group, and "al" is two-thirds of an equivalent of aluminum.

32. A process of preparing an organoaluminum compound possessing a 4-vinylic-(1-alumina-2-oxacyclopentane) moiety which comprises reacting in a stable Lewis base reaction medium (i) an aldehyde or a ketone and (ii) an organoaluminum compound coreactive therewith to cause 1:1 addition therebetween, said organoaluminum compound having the formula

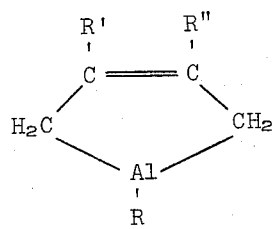

wherein R is a hydrocarbon group having up to about 18 carbon atoms, R' is a hydrogen, lower alkyl or lower alkenyl group, and R" is a hydrogen or lower alkyl group.

33. The process of claim 32 wherein R is a lower alkyl group.

34. The process of claim 32 wherein the reaction medium consists essentially of an ether or a tertiary amine.

35. The process of claim 32 wherein R is a lower alkyl group and the reaction medium is at least one dialkyl ether or cycloparaffinic monoether having a six-membered ring or cycloparaffinic diether having a five- or six-membered ring.

* * * * *

UNITED STATES PATENT OFFICE
CERTIFICATE OF CORRECTION

PATENT NO. : 3,862,199
DATED : January 21, 1975
INVENTOR(S) : Lawrence H. Shepherd, Jr.

It is certified that error appears in the above-identified patent and that said Letters Patent are hereby corrected as shown below:

Cover page in item [56], "Elements-Organic" should read -- Elemento-Organic --; "Leiss" should read -- Zeiss --. Column 2, line 24, "do so" should read -- doing so --. Column 4, line 3, "moiety that the" should read -- sense that the --. Column 6, in the TABLE, "(5)" was omitted from the top of the last column. Column 9, line 9, "4-vinyl-1-ethyl-3-benzyl-(1-alumina-2-" should read -- 4-vinyl-1-ethyl-3-octyl-(1-alumina-2- --; line 11, "4-isopropenyl-1-propyl-3-penzyl-(1-alumina-2-" should read -- 4-isopropenyl-1-propyl-3-benzyl-(1-alumina-2- --. Insert the following TABLE between the bottom of Columns 5 and 6 and the top of Columns 7 and 8: as shown on the attached sheet.

Signed and Sealed this twenty-third Day of September 1975

[SEAL]

Attest:

RUTH C. MASON
Attesting Officer

C. MARSHALL DANN
Commissioner of Patents and Trademarks

TABLE (Continued)

| Aluminacyclopent-3-ene Moiety in the Reactant (1) | Aldehyde or Ketone Reactant (2) | 4-Vinylic-(1-alumina-2-oxa-cyclopentane) Moiety Formed on 1:1 Addition Between (1) and (2) (3) | Olefinically Unsaturated Alcohol Formed on Hydrolysis of (3) (4) | Olefinically Unsaturated Diol Formed on Oxidation of (3) Followed by Hydrolysis (5) |
|---|---|---|---|---|
| 3-ethyl-aluminacyclopent-3-ene | methyl-t-butyl ketone | 4-(1-ethylvinyl)-3-t-butyl-3-methyl-(1-alumina-2-oxacyclopentane) | 5-ethyl-2,3,4-tetramethyl-hex-5-en-3-ol | 2-(1-ethylvinyl)-3,4,4-tri-methyl-pentane-1,3-diol |
| aluminacyclopent-3-ene | cycloheptadecanone | cycloheptadecanespiro-[5'-vinyl-(3'-alumina-2'-oxacyclopentane)] | 1-(1-methylallyl)-cycloheptadecan-1-ol | 1-(1-hydroxymethylallyl)-cycloheptadecan-1-ol |
| aluminacyclopent-3-ene | benzophenone | 4-vinyl-3,3-diphenyl-(1-alumina-2-oxacyclopentane) | 1-methylallyl)-1,1-diphenylcarbinol | 2-vinyl-1,1-diphenyl-pentane-1,3-diol |
| aluminacyclopent-3-ene | mesityl oxide | 4-vinyl-3-(2-methyl-propenyl)-3-methyl-(1-alumina-2-oxacyclopentane) | 3,4,6-trimethyl-hepta-1,5-dien-4-ol | 2-vinyl-3,5-dimethyl-hex-4-ene-1,3-diol |
| aluminacyclopent-3-ene | stearone | 4-vinyl-3,3-heptadecyl-(1-alumina-2-oxacyclopentane) | 4-heptadecyl-3-methyl-henicos-1-en-4-ol | 2-vinyl-3-heptadecyl-eicosane-1,3-diol |
| 3-methyl-aluminacyclopent-3-ene | 1-chloro-3-pentanone | 4-isopropenyl-3-(2-chloroethyl)-3-ethyl-(1-alumina-2-oxacyclopentane) | 1-chloro-3-ethyl-4,5-dimethyl-hex-5-en-3-ol | 3-chloro-2-isopropenyl-3-ethyl-pentane-1,3-diol |